(12) United States Patent
Tanaka et al.

(10) Patent No.: US 9,186,658 B2
(45) Date of Patent: Nov. 17, 2015

(54) HYDROCRACKING CATALYST AND METHOD FOR PRODUCING A HYDROCARBON OIL

(75) Inventors: Yuichi Tanaka, Tokyo (JP); Takuya Niitsuma, Tokyo (JP); Kazuhiko Tasaka, Tokyo (JP); Marie Iwama, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 14/008,164

(22) PCT Filed: Mar. 26, 2012

(86) PCT No.: PCT/JP2012/057766
§ 371 (c)(1),
(2), (4) Date: Dec. 6, 2013

(87) PCT Pub. No.: WO2012/133318
PCT Pub. Date: Oct. 4, 2012

(65) Prior Publication Data
US 2014/0124411 A1    May 8, 2014

(30) Foreign Application Priority Data
Mar. 31, 2011    (JP) .................. P2011-080578

(51) Int. Cl.
| | |
|---|---|
| *B01J 29/12* | (2006.01) |
| *C10G 47/18* | (2006.01) |
| *C10G 45/60* | (2006.01) |
| *C10G 45/70* | (2006.01) |
| *C10G 11/18* | (2006.01) |
| *B01J 35/02* | (2006.01) |
| *B01J 37/00* | (2006.01) |
| *C10G 45/62* | (2006.01) |
| *C10G 45/64* | (2006.01) |

(52) U.S. Cl.
CPC ............. *B01J 29/126* (2013.01); *B01J 29/12* (2013.01); *B01J 35/023* (2013.01); *B01J 35/026* (2013.01); *B01J 37/0018* (2013.01); *C10G 11/18* (2013.01); *C10G 45/60* (2013.01); *C10G 45/62* (2013.01); *C10G 45/64* (2013.01); *C10G 45/70* (2013.01); *C10G 47/18* (2013.01); *B01J 2229/24* (2013.01); *C10G 2300/1048* (2013.01); *C10G 2300/301* (2013.01); *C10G 2400/30* (2013.01)

(58) Field of Classification Search
CPC ........ B01J 29/126; B01J 29/12; C10G 45/70; C10G 45/60; C10G 11/18; C10G 47/18; C10G 2300/1048; C10G 2400/30; C10G 2300/301
USPC ...................................... 208/111.35
See application file for complete search history.

(56) References Cited

U.S. PATENT DOCUMENTS

| | | | |
|---|---|---|---|
| 3,344,059 A | 9/1967 | Engebretson | |
| 4,632,914 A * | 12/1986 | Arias et al. ................... | 502/211 |
| 4,859,308 A | 8/1989 | Harandi et al. | |
| 5,908,804 A | 6/1999 | Menon et al. | |
| 6,398,950 B1 | 6/2002 | Iwamoto et al. | |
| 7,304,012 B2 | 12/2007 | Green et al. | |
| 8,002,970 B2 | 8/2011 | Euzen et al. | |
| 2005/0148456 A1 | 7/2005 | Dufresne et al. | |
| 2005/0250863 A1 | 11/2005 | Green et al. | |
| 2006/0231464 A1 | 10/2006 | Brignac et al. | |
| 2009/0118556 A1 | 5/2009 | Euzen et al. | |
| 2010/0300933 A1 * | 12/2010 | Tanaka ........................ | 208/62 |
| 2011/0180455 A1 * | 7/2011 | Bouchy et al. ............... | 208/49 |

FOREIGN PATENT DOCUMENTS

| | | |
|---|---|---|
| AU | 2007232039 B2 | 9/2011 |
| CA | 882679 | 10/1971 |
| CN | 1126238 | 7/1996 |
| CN | 1662300 | 8/2005 |
| CN | 101410490 | 4/2009 |
| EP | 0 325 438 | 7/1989 |
| EP | 0 541 994 | 5/1993 |
| JP | 1-1279993 | 11/1989 |
| JP | 2004-323626 | 11/2004 |
| JP | 2005-279382 | 10/2005 |
| JP | 2005-529744 | 10/2005 |
| JP | H08-173817 | 7/2006 |
| JP | 2007-204506 | 8/2007 |
| JP | 2007-270067 | 10/2007 |
| JP | 2008-138187 | 6/2008 |
| JP | 2008-525174 | 7/2008 |
| JP | 2008-536977 | 9/2008 |
| JP | 2011-031194 | 2/2011 |
| WO | 2011/004690 | 1/2011 |

OTHER PUBLICATIONS

English translation of the International Preliminary Report on Patentability for PCT/JP2012/057766, mailed on Oct. 17, 2013.
International Search Report for PCT/JP2012/057766, mailed on Jun. 19, 2012.
Extended European Search Report of EP Patent Application No. 12764266.8 mailed on Oct. 9, 2014.
Notice of Allowance issued in JP Patent Application No. 2011-080578 mailed on Nov. 11, 2014.
Office Action issued in CN Patent Application No. 201280017068.X mailed on Sep. 25, 2014.

* cited by examiner

*Primary Examiner* — Prem C Singh
*Assistant Examiner* — Juan Valencia
(74) *Attorney, Agent, or Firm* — Greenblum & Bernstein, P.L.C.

(57) ABSTRACT

The hydrocracking catalyst of the present invention is a hydrocracking catalyst comprising a catalyst support comprising a zeolite and an amorphous composite metal oxide having solid acidity, and at least one active metal supported by the catalyst support and selected from noble metals of Group 8 to Group 10 in the periodic table, wherein the hydrocracking catalyst contains a carbonaceous substance comprising a carbon atom, and the content of the carbonaceous substance in the hydrocracking catalyst is 0.05 to 1% by mass in terms of the carbon atom.

11 Claims, 2 Drawing Sheets

HYDROCRACKING CATALYST AND METHOD FOR PRODUCING A HYDROCARBON OIL

TECHNICAL FIELD

The present invention relates to a hydrocracking catalyst and a process for producing a hydrocarbon oil using the hydrocracking catalyst.

BACKGROUND ART

Recently, from the viewpoint of raise in environmental consciousness, liquid fuels in which the contents of environmental load substances such as sulfur and aromatic hydrocarbons are small have been demanded. From such a viewpoint, as a technique which can produce a base stock for fuel oil that substantially contains neither sulfur nor aromatic hydrocarbons and is rich in aliphatic hydrocarbons, particularly, base stock for kerosene and gas oil, a technique that has been attracting attention is one which synthesis gas (mixed gas containing carbon monoxide gas and hydrogen gas as main components) is produced from a hydrocarbon source such as natural gas by a reforming reaction, hydrocarbons are synthesized from this synthesis gas by a Fischer-Tropsch synthesis reaction (hereinafter, also referred to as the "FT synthesis reaction"), and the hydrocarbons are further refined by hydroprocessing and fractionation to thereby obtain a base stock for fuel oil (see Patent Literature 1, for example). This technique is called GTL (Gas To Liquids) process.

A synthetic oil obtained from synthesis gas by the FT synthesis reaction (hereinafter, also referred to as the "FT synthetic oil") is a mixture containing aliphatic hydrocarbons with a wide carbon number distribution as a main component. A naphtha fraction, a middle distillate fraction, and a wax fraction can be obtained by fractionating this FT synthetic oil according to boiling points. Among the respective fractions, the middle distillate is the most useful fraction corresponding to base stock for kerosene and gas oil and is desired to be obtained with a high yield.

Hydrocarbons can be obtained with a boiling point range comparable to the middle distillate by hydrocracking a wax fraction contained in a significant amount in combination with the middle distillate in the FT synthetic oil, and the useful middle distillate can be obtained with a high yield from the FT synthetic oil by using this method.

In the hydrocracking of a hydrocarbon raw oil containing the above-described wax fraction, it is necessary to enhance the cracking rate of the wax fraction, for enhancing the yield of the middle distillate; on the other hand, there is a problem that if the cracking rate is enhanced, the production of the light fraction attributed to excessive hydrocracking raises and rather the yield of the middle distillate reduces. Thus, as a hydrocracking catalyst used in the hydrocracking of a hydrocarbon raw oil containing the wax fraction, it is required to have a high hydrocracking activity and also to suppress the production of the light fraction attributed to excessive hydrocracking and give the middle distillate with a high selectivity. As such a hydrocracking catalyst, a catalyst comprising a catalyst support comprising a zeolite and an amorphous composite metal oxide having solid acidity and an active metal supported by the catalyst support and selected from noble metals of Group 8 to Group 10 in the periodic table is known (see Patent Literatures 2 and 3, for example).

CITATION LIST

Patent Literature

[Patent Literature 1] Japanese Patent Application Laid-Open Publication No. 2004-323626
[Patent Literature 2] Japanese Patent Application Laid-Open Publication No. 2005-279382
[Patent Literature 3] Japanese Patent Application Laid-Open Publication No. 2007-204506

SUMMARY OF INVENTION

Technical Problem

However, in the hydrocracking of a wax fraction, the above-described conventional hydrocracking catalyst exhibits a high hydrocracking activity in an early stage after starting of the operation, but reduction in hydrocracking activity gets large with the time on stream and a middle distillate selectivity also reduces therewith. As a result, the yield of the middle distillate was not satisfactory in the so-called "stable phase of the catalyst" subsequent to the end of the early stage of the operation during which large fluctuation (reduction) in activity occurred. The life of the hydrocracking catalyst is shortened even if a reaction temperature is raised in order to compensate for the reduced cracking rate, and therefore, it is desirable that the properties of the hydrocracking catalyst in the stable phase be improved for stably obtaining much middle distillates over a long period. However, sufficient studies have not been made yet on a method therefor.

The present invention has been made in consideration of such circumstances, and an object of the present invention is to provide a hydrocracking catalyst that is capable of obtaining middle distillate with a high yield even in the stable phase of the catalyst in the hydrocracking of a hydrocarbon raw oil containing a wax fraction intended for the production of the middle distillate, and a process for producing a hydrocarbon oil using the hydrocracking catalyst.

Solution to Problem

As a result of conducting diligent studies in order to solve the problem above, the present inventors have found that a particular hydrocracking catalyst containing an organic compound-derived carbonaceous substance in a particular amount sufficiently has an activity for moderate hydrocracking of hydrocarbons in a wax fraction with its activity for excessive hydrocracking suppressed, and can further enhance the yield of middle distillate, wherein such properties are maintained even in the stable phase of the catalyst, and have completed the present invention based on this finding.

Specifically, the present invention provides a hydrocracking catalyst comprising a catalyst support comprising a zeolite and an amorphous composite metal oxide having solid acidity, and at least one active metal supported by the catalyst support and selected from noble metals of Group 8 to Group 10 in the periodic table, wherein the hydrocracking catalyst contains a carbonaceous substance comprising a carbon atom, and the content of the carbonaceous substance in the hydrocracking catalyst is 0.05 to 1% by mass in terms of the carbon atom.

According to the hydrocracking catalyst of the present invention having the configuration above, a sufficient middle distillate selectivity can be maintained even in the stable phase of the catalyst in the hydrocracking of a hydrocarbon raw oil containing a wax fraction and a middle distillate can be obtained with a high yield over a long period.

Preferably, in the hydrocracking catalyst of the present invention, the zeolite is ultra stable Y-type zeolite. In the case of using this hydrocracking catalyst in the hydrocracking of a hydrocarbon raw oil in which a wax fraction is contained, a middle distillate can be obtained with a higher yield.

In addition, preferably, in the hydrocracking catalyst of the present invention, the amorphous composite metal oxide is at least one selected from silica alumina, alumina boria, and silica zirconia. In the case of using this hydrocracking catalyst in the hydrocracking of a hydrocarbon raw oil in which a wax fraction is contained, a middle distillate can be obtained with a higher yield.

In addition, preferably, in the hydrocracking catalyst of the present invention, the active metal is platinum. In the case of using this hydrocracking catalyst in the hydrocracking of a hydrocarbon raw oil in which a wax fraction is contained, a middle distillate can be obtained with a higher yield.

The present invention also provides a process for producing a hydrocarbon oil, comprising contacting a raw oil comprising 70% by mass or more of straight-chain aliphatic hydrocarbons with a boiling point of higher than 360° C., with the above-described hydrocracking catalyst of the present invention in the presence of molecular hydrogen.

According to the process for producing a hydrocarbon oil of the present invention, a middle distillate can be obtained with a high yield over a long period from the above-described raw oil by using the hydrocracking catalyst of the present invention.

Preferably, in the process for producing a hydrocarbon oil of the present invention, the raw oil is a synthetic oil obtained by a Fischer-Tropsch synthesis reaction. By using the synthetic oil obtained by a Fischer-Tropsch synthesis reaction as the raw oil, a middle distillate can be obtained with a high yield that contains neither sulfur nor aromatic hydrocarbons.

Advantageous Effects of Invention

According to the present invention, a middle distillate can be obtained with a high yield from a hydrocarbon raw oil containing a wax fraction.

DESCRIPTION OF EMBODIMENTS

Figure 1:
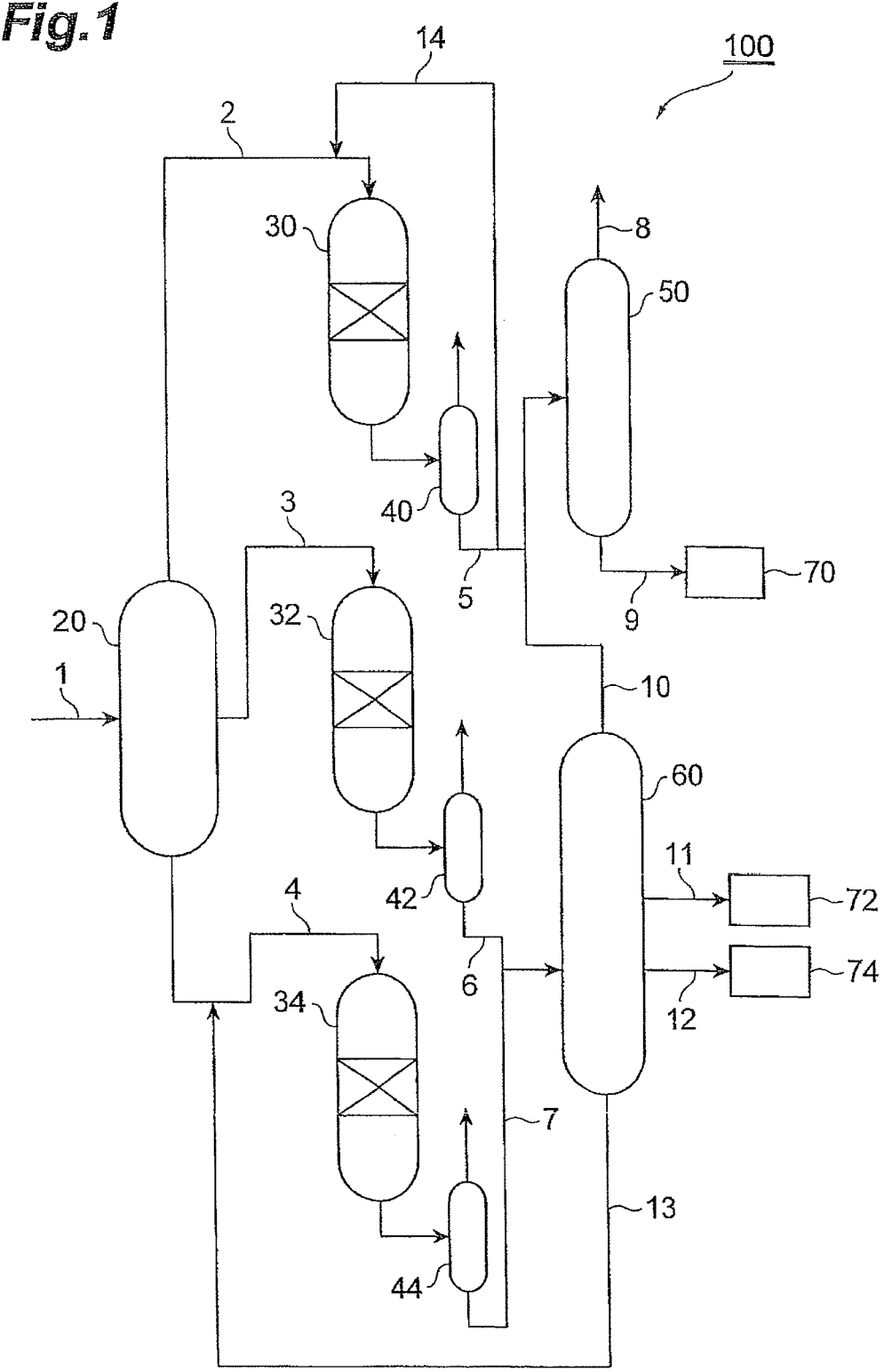
FIG. 1 is a schematic configuration view showing an apparatus for producing a hydrocarbon oil in which one embodiment of a process for producing a hydrocarbon oil of the present invention is carried out.

First, a preferable embodiment of a hydrocracking catalyst of the present invention will be described.

The hydrocracking catalyst of the present embodiment is a hydrocracking catalyst comprising a catalyst support comprising a zeolite and an amorphous composite metal oxide having solid acidity, and at least one active metal supported by the catalyst support and selected from noble metals of Group 8 to Group 10 in the periodic table, wherein the hydrocracking catalyst contains a carbonaceous substance comprising a carbon atom, and the content of the carbonaceous substance in the hydrocracking catalyst is 0.05 to 1% by mass in terms of the carbon atom. This content of the carbonaceous substance in the hydrocracking catalyst is a value based on the whole mass of the catalyst.

The catalyst support that constitutes the hydrocracking catalyst of the present embodiment contains a zeolite. As this zeolite, ultra stable Y-type zeolite (USY zeolite), Y-type zeolite, mordenite, and β zeolite, and the like are preferable. Among these, USY zeolite is particularly preferable.

The average particle size of USY zeolite is not particularly limited, but it is preferably not larger than 1.0 μm, and more preferably not larger than 0.5 μm. In addition, in USY zeolite, it is preferable that a molar ratio of silica/alumina (molar ratio of silica to alumina) be 10 to 200, and it is more preferable that the molar ratio be 15 to 100, and it is still more preferable that the molar ratio be 20 to 60.

The catalyst support contains an amorphous composite metal oxide having solid acidity. This amorphous composite metal oxide comprises a combination of 2 or 3 or more selected from metal oxide such as alumina, silica, titania, zirconia, boria, and magnesia. Specific examples of the amorphous composite metal oxide having solid acidity include silica alumina, silica zirconia, alumina boria, alumina zirconia, silica titania, and silica magnesia. Among these, silica alumina, alumina boria, and silica zirconia are preferable, and silica alumina and alumina boria are more preferable.

As the catalyst support, those comprising USY zeolite, and one or more selected from silica alumina, alumina boria, and silica zirconia are preferable, and those comprising USY zeolite and silica alumina and/or alumina boria are more preferable.

Moreover, it is preferable that the catalyst support be constituted by containing 0.1 to 20% by mass of the zeolite and 10 to 99.5% by mass of the amorphous composite metal oxide having solid acidity.

Moreover, in the case where the catalyst support is constituted by containing USY zeolite, the proportion of USY zeolite to be compounded is preferably 0.1 to 10% by mass, and more preferably 0.5 to 5% by mass based on the entire mass of the catalyst support.

In the case where the catalyst support is constituted by containing USY zeolite and silica alumina, it is preferable that the proportion of USY zeolite to silica alumina to be compounded (USY zeolite/silica alumina) be 0.03 to 1 in the mass ratio.

Further, in the case where the catalyst support is constituted by containing USY zeolite and alumina boria, it is preferable that the proportion of USY zeolite to alumina boria to be compounded (USY zeolite/alumina boria) be 0.03 to 1 in the mass ratio.

The catalyst support may contain a binder in addition to the zeolite and the amorphous composite metal oxide having solid acidity. The binder is not particularly limited, but alumina, silica, titania, and magnesia are preferable, and alumina is more preferable. The amount of the binder to be compounded is preferably 20 to 98% by mass, and more preferably 30 to 96% by mass based on the entire mass of the catalyst support.

The catalyst support is preferably molded. Examples of the shape of the molded catalyst support include, but not particularly limited to, a sphere, a cylinder, an irregular cylinder having a trilobes or quadrolobes, and a disc. A method for molding the catalyst support is not limited, and a known method such as extrusion molding or compression molding is used. The molded catalyst support is usually calcined.

The active metal supported by the catalyst support in the hydrocracking catalyst of the present embodiment is at least one selected from noble metals of Group 8 to Group 10 in the periodic table. Specific examples of the metal are ruthenium and osmium as noble metals of Group 8, rhodium and iridium as noble metals of Group 9, and palladium and platinum as noble metals of Group 10. Among these, a preferable noble metal is platinum or palladium, and more preferably platinum. In addition, a combination of platinum-palladium is also preferably used. Here, the periodic table means the long form of the periodic table of the elements based on the specification of IUPAC (International Union of Pure and Applied Chemistry).

As the content of the active metal supported by the catalyst support in the hydrocracking catalyst of the present embodiment, 0.1 to 3% by mass in terms of the metal atom based on the mass of the catalyst support is preferable. In the case where the content of the active metal is less than the lower limit value, hydrocracking tends not to sufficiently proceed. On the other hand, in the case where the content of the active metal is more than the upper limit value, dispersion of the active metal tends to be reduced to reduce the activity of the catalyst, and cost of the catalyst is increased.

The hydrocracking catalyst of the present embodiment contains an organic compound-derived carbonaceous substance comprising a carbon atom, at a proportion in which the content of the carbonaceous substance in the hydrocracking catalyst is 0.05 to 1% by mass in terms of the carbon atom. Examples of this organic compound-derived carbonaceous substance include carbides obtained by carbonizing an organic compound by heating. A carbon-containing substance that is composed of carbon atoms or carbon atoms and small amounts of hydrogen atoms and/or oxygen atoms and the like, and whose structure is not definitely identified is also encompassed by the carbides. The carbonaceous substance according to the present invention can be produced on the hydrocracking catalyst, for example, by adding an organic compound to the catalyst support that constitutes the hydrocracking catalyst according to the present invention or a precursor of the hydrocracking catalyst described later and calcining or heating this.

In the case where the content of the carbonaceous substance in the catalyst is less than 0.05% by mass, it tends to be impossible to sufficiently suppress an activity possessed by the hydrocracking catalyst for excessive hydrocracking, thereby making it difficult to improve middle distillate selectivity in a produced oil. On the other hand, in the case where the content of the carbonaceous substance is more than 1% by mass, reduction in the activity of the hydrocracking catalyst for hydrocracking becomes significant and thus requires increasing a hydrocracking reaction temperature for maintaining the predetermined cracking rate, and the life of the catalyst tends to be shortened.

As a method for quantifying the carbonaceous substance in the hydrocracking catalyst, a method is adopted in which a sample of the hydrocracking catalyst is heated with high frequency wave in a stream of oxygen for combustion of the carbonaceous substance, and carbon dioxide in the combustion gas is quantified with a detector using infrared absorption (for example, with the carbon/sulfur analyzer EMIA-920V produced by Horiba, Ltd.).

Next, a method for producing the hydrocracking catalyst of the present embodiment will be described below by taking two aspects as examples.

First, the first embodiment of the method for producing the hydrocracking catalyst of the present embodiment will be described. The method of the first embodiment is a method of using, as an organic compound source, a molding additives compounded during molding of the catalyst support that constitutes the hydrocracking catalyst to allow the predetermined amount of the carbonaceous substance to be contained in the hydrocracking catalyst.

First, a mixture comprising the above-described zeolite and amorphous composite metal oxide having solid acidity or a gel thereof, the above-described binder, a molding additives, and, if necessary, a liquid such as water is kneaded to prepare a clay-like kneaded mixture.

Here, the molding additives is an organic compound compounded in order to improve the moldability of the kneaded mixture and the mechanical strength of the obtained molded catalyst support. The molding additives is not particularly limited, but organic compounds with a large molecular weight such as crystalline cellulose, methylcellulose, carboxymethylcellulose, hydroxyethylcellulose, polyvinyl alcohol, starch, and lignin are preferable for sufficiently obtaining effects by compounding the molding additives. This molding additives, in the conventional production of hydrocracking catalysts, is removed during calcining of the catalyst support and/or calcining of the catalyst precursor described later, and the carbonaceous substance derived from the molding additives does not remain in the obtained catalyst. On the other hand, in the first embodiment of the method for producing the hydrocracking catalyst of the present embodiment, the carbonaceous substance derived from the organic compound compounded as the molding additives is allowed to remain in the predetermined amount on the catalyst by adjusting calcining conditions during calcining of the catalyst support and calcining of the catalyst precursor.

The organic compound that is a source from which the carbonaceous substance is derived is not necessarily required to be the molding additives and may be other organic compounds as long as it can produce the predetermined amount of the carbonaceous substance on the catalyst. However, by adopting the method of producing the molding additives-derived carbonaceous substance in the predetermined amount, the hydrocracking catalyst of the present embodiment can be obtained without largely changing the conventional method for preparing a catalyst except for adjusting conditions for calcining of the catalyst support and calcining of the catalyst precursor described later, thus this method is preferably adopted.

The amount of the molding additives to be compounded is preferably 0.5 to 15% by mass, and more preferably 1 to 10% by mass based on the total mass of the inorganic compounds (the zeolite, the amorphous composite metal oxide having solid acidity, the binder, and the other inorganic compounds compounded in some cases) that constitute the catalyst support.

Next, the above-described kneaded mixture is extrusion molded to thereby obtain a mold, and the mold is further dried at, for example, 70 to 150° C.

Next, the dried mold is calcined to thereby obtain a catalyst support. In this case, the calcining conditions are selected so as to sufficiently exert the mechanical strength of the obtained calcined catalyst support and allow a residue containing the molding additives-derived carbon atom to remain in an appropriate amount on the catalyst support. Here, the residue containing the molding additives-derived carbon atom is a carbon-containing substance comprising carbon atoms or carbon atoms and hydrogen atoms and/or oxygen atoms and the like produced by the calcining of the catalyst support during which the molding additives is cracked due to so-called "carbonization" such as oxidative dehydrogenation, and means one having a structure similar to that of the above-described carbonaceous substance or one that has not been carbonized more than the carbonaceous substance and becomes the carbonaceous substance by calcining of the catalyst precursor described later.

Combinations of various calcining temperatures and calcining times can be set as the catalyst support calcining conditions for satisfying the requirements. In this case, it is preferable to take into consideration the amount of the molding additives to be compounded. For example, as the calcining temperature, the range of 300 to 550° C. is preferable, and the range of 350 to 500° C. is more preferable. In addition, as the calcining time, the range of about 0.1 hour to about 10 hours is preferable, and the range of about 0.2 hour to about 8 hours is more preferable.

Next, a compound containing the above-described active metal element is supported by the catalyst support obtained as described above. The compound containing the noble metal element used in the supporting is not particularly limited as long as it contains the noble metal element, and a known compound is used, but an inorganic or organic compound soluble in a solvent, particularly, water is used. Specific examples of the compound containing the active metal element include: in the case where the noble metal is ruthenium, $RuCl_3$; in the case where the noble metal is osmium, $OsCl_3.3H_2O$ and $(NH_4)_2[OsCl_6]$; in the case where the noble metal is rhodium, $RhCl_3.3H_2O$; in the case where the noble metal is iridium, $H_2IrCl_6.6H_2OH$; in the case where the noble metal is palladium, $(NH_4)_2PdCl_6$, $Pd(NH_3)_4Cl_2.H_2O$, and $Pd(C_2H_5CO_2)_2$; and in the case where the noble metal is platinum, $PtCl_2$, $H_2PtCl_6$, $(NH_4)_2PtCl_6$, $H_2Pt(OH)_6$, $Pt(NH_3)_4Cl_2.H_2O$, and $Pt(C_5H_7O_2)_2$.

The supporting of the compound containing the active metal element can be performed by a known method. Specifically, a method of impregnating the molded catalyst support with a solution, preferably an aqueous solution of the compound, a method of performing ion exchange, or the like, is preferably used. The impregnation method is not particularly limited, and an incipient wetness method or the like is preferably used.

Next, the catalyst support by which the compound containing the active metal element is supported by the method is dried. The drying can be performed at a temperature of, for example, about 70° C. to about 150° C.

The thus-obtained catalyst support by which the compound containing the active metal element is supported (hereinafter, also referred to as the "catalyst precursor") is calcined to obtain the hydrocracking catalyst of the present embodiment. In the calcining of the catalyst precursor, components other than the active metal atom, that is, counterions, ligands, and the like, are removed from the active metal element-containing compound supported by the catalyst support, while the content of the molding additives-derived carbonaceous substance is adjusted to 0.05 to 1% by mass in terms of the carbon atom.

The calcining conditions for the catalyst precursor can be set to combinations of various calcining temperatures and calcining times. In this case, it is preferable to take into consideration the content of the residue containing the molding additives-derived carbon atom formed on the catalyst support by the calcining of the catalyst support. For example, the calcining temperature is preferably in the range of 300 to 550° C., and more preferably in the range of 350 to 530° C. In addition, as the calcining time, the range of about 0.1 hour to about 10 hours is preferable, and the range of about 0.2 hour to about 8 hours is more preferable.

Noble metals such as platinum and palladium have a catalytic activity for an oxidation reaction. Therefore, in the calcining of the catalyst precursor, oxidation of the residue containing the molding additives-derived carbon atom contained in the catalyst precursor easily proceeds even at a relatively low temperature. Further, the substantial temperature of the catalyst precursor may rise due to the heat of this oxidation reaction, causing the oxidation to rapidly proceed, that is, attaining combustion of the residue. In this case, it tends to be impossible to control the content of the carbonaceous substance in the obtained catalyst, so that the carbonaceous substance completely disappears or a catalyst containing a carbonaceous substance with a smaller content than the predetermined value is obtained. Further, in this case, the substantial temperature of the catalyst precursor tends to rise due to the heat of combustion to largely exceed the set calcining temperature, thereby aggregating the active metal and thus reducing the activity of the obtained catalyst. In order to prevent the occurrence of such a rapid oxidation reaction, it is preferable for the calcining of the catalyst precursor to suppress the rapid oxidation of the residue containing the molding additives-derived carbon atom at least in the early stage thereof, and select conditions under which oxidation gradually proceeds. Specifically, it is preferable to charge the catalyst precursor to a heating apparatus for performing calcining and sufficiently reduce the heating rate within the temperature range in which at least the oxidation of the residue proceeds (for example, about 250° C. to about 400° C.) during heating to the set calcining temperature, thereby preventing the rapid oxidation reaction from occurring in the course of the heating. Such a heating rate is, for example, 1 to 50° C./h and preferably about 5° C./h to about 30° C./h.

In addition, it is also preferable to perform the calcining of the catalyst precursor in 2 stages. Specifically, it is a method comprising the first stage in which calcining is performed under lower temperature conditions so that the oxidation of the residue gradually proceeds, and the second stage in which after the oxidation proceeds and the amount of the remaining residue is decreased to such a degree that rapid oxidation does not proceed, calcining is performed under higher temperature conditions to control the content of the carbonaceous substance in the catalyst. In this case, for example, the range of 250 to 400° C. and, for example, the range of 350 to 550° C. are selected as the calcining temperature in the first stage and the second calcining temperature, respectively.

In this way, the hydrocracking catalyst of the present embodiment is obtained.

Next, the second embodiment of the method for producing the hydrocracking catalyst of the present embodiment will be described. The method of the second embodiment is a method in which a hydrocracking catalyst that does not contain the carbonaceous substance is temporarily prepared by the conventional method, and the catalyst is dipped in an organic compound and then subjected to a heating treatment to thereby allow the predetermined amount of the carbonaceous substance to be contained in the catalyst.

First, a mixture comprising the above-described zeolite and amorphous composite metal oxide having solid acidity or a gel thereof, the above-described binder, and, if necessary, a liquid such as water is kneaded to prepare a clay-like kneaded mixture. In this case, a molding additives may be compounded therein, as in the above-described method of the first embodiment. Then, molding and drying of the catalyst support are performed by operation similar to that in the above-described method of the first embodiment.

The obtained dried mold is calcined to obtain a catalyst support. In the case of compounding the molding additives in the step of preparing the kneaded mixture, it is preferable to reduce, when the catalyst support is calcined, the amount of the remaining residue containing the molding additives-derived carbon atom to such a degree that the above-described rapid oxidation does not occur by the calcining of a catalyst precursor (one in which a compound containing the active metal element is supported by the catalyst support) in a later stage. It is also preferable to perform calcining so that the residue disappears.

Combinations of various calcining temperatures and calcining times can be set as such catalyst support calcining conditions. In this case, it is preferable to take into consideration the amount of the molding additives to be compounded. For example, as the calcining temperature, the range of 300 to 600° C. is preferable, and the range of 350 to 550° C. is more preferable. In addition, as the calcining time, the range of about 0.1 hour to about 10 hours is preferable, and the range of about 0.2 hour to about 8 hours is more preferable.

In this way, the catalyst support is obtained.

Next, a compound containing the active metal element is supported by the catalyst support obtained as described above, and drying is further performed. The supporting of this compound containing the active metal element and the drying can be performed in the same way as in the above-described method of the first embodiment. In this way, the catalyst precursor is obtained.

Next, the obtained catalyst precursor is calcined to obtain a catalyst. The calcining conditions for the catalyst precursor may be similar to the conventional calcining conditions for hydrocracking catalyst precursors, and, for example, the calcining temperature is 350 to 600° C., and the calcining time is about 0.5 hour to about 10 hours. Hereinafter, the catalyst in this stage is also referred to as the "preliminary catalyst".

The preliminary catalyst thus obtained is dipped in a liquid organic compound. The liquid organic compound is not particularly limited as long as it does not contain sulfur, nitrogen, halogen, or the like that becomes a catalytic poison, but a liquid hydrocarbon is preferable, and, for example, a naphtha fraction, a kerosene fraction, or a gas oil fraction produced by the GTL process is preferably used. A method for dipping the catalyst in the liquid organic compound is not limited.

The preliminary catalyst dipped in the liquid organic compound is taken out from the organic compound, and a deoiling treatment is performed in inert gas, preferably, nitrogen gas. By this deoiling treatment, excessive organic compounds attached to the preliminary catalyst by the dipping volatilize. Conditions of the deoiling treatment cannot be generalized because of varying depending on the organic compound for dipping, and the like, but the temperature is about 180° C. to about 500° C., and the time is about 0.1 hour to about 10 hours.

Next, the preliminary catalyst subjected to the deoiling treatment is subjected to a heat treatment (calcining) under an atmosphere containing molecular oxygen, preferably under an air atmosphere, to carbonize the above-described organic compound, for example, a gas oil remaining in the preliminary catalyst, thereby producing a carbonaceous substance. The calcining conditions can be set appropriately according to the organic compound used, the content of the organic compound remaining in the preliminary catalyst after the deoiling treatment, the content of the carbonaceous substance contained in the catalyst, and the like. For example, the calcining temperature is preferably in the range of 300 to 550° C., and 350 to 530° C. is more preferable. The calcining time is preferably about 0.1 hour to about 10 hours, and more preferably about 0.2 hour to about 8 hours. In this way, the carbonaceous substance is produced in the catalyst so that its content becomes 0.05 to 1% by mass in terms of the carbon atom.

In the above-described example, the preliminary catalyst obtained by calcining the catalyst precursor is dipped in the organic compound and calcined again after the deoiling treatment to obtain the hydrocracking catalyst of the present embodiment, whereas the catalyst precursor is dipped in the organic compound without calcining the catalyst precursor and the hydrocracking catalyst may be obtained by one calcining after the deoiling treatment.

In this way, the hydrocracking catalyst of the present embodiment can be obtained.

Next, a process for producing a hydrocarbon oil of the present invention will be described.

The process for producing a hydrocarbon oil of the present invention comprises a step of contacting a raw oil comprising 70% by mass or more of straight-chain aliphatic hydrocarbons with a boiling point of higher than 360° C., with the above-described hydrocracking catalyst of the present invention in the presence of molecular hydrogen. By this step, hydrocracking of the raw oil is performed.

Hereinafter, an embodiment of the process for producing a hydrocarbon oil of the present invention will be described with reference to an example of a GTL process in which the process for producing a hydrocarbon oil of the present invention is preferably used.

FIG. 1 is a schematic configuration view showing a production facility corresponding to an upgrading unit in the GTL process including an apparatus for producing a hydrocarbon oil in which one embodiment of the process for producing a hydrocarbon oil of the present invention is carried out.

First, referring to FIG. 1, an apparatus for producing naphtha and a kerosene and base stock for gas oil from hydrocarbons obtained by a FT synthesis reaction (FT synthetic oil), in which a suitable embodiment of the process for producing a hydrocarbon oil of the present invention is carried out, will be described.

An apparatus for producing a hydrocarbon oil 100 shown in FIG. 1 is fed with a FT synthetic oil through a line 1 from a FT synthesis reaction apparatus (not shown) that synthesizes a hydrocarbon oil (FT synthetic oil) by a FT synthesis reaction with a synthesis gas (mixed gas of carbon monoxide gas and hydrogen gas) as a raw material. The FT synthesis reaction apparatus is fed with synthesis gas from a reforming reaction apparatus (not shown) that reforms natural gas to produce synthesis gas.

The apparatus for producing a hydrocarbon oil 100 mainly comprises a first fractionator 20 of fractionating a FT synthetic oil to a raw naphtha fraction, a raw middle distillate, and a raw wax fraction, a naphtha fraction hydrotreating reactor 30 of hydrotreating the raw naphtha fraction fed from the top of the first fractionator 20 by a line 2, middle distillate hydrotreating reactor 32 of hydrotreating and hydro-isomerizing the raw middle distillate fed from the middle portion of the first fractionator 20 by a line 3, a wax fraction hydrocracking reactor 34 of hydrocracking the raw wax fraction fed from the bottom portion of the first fractionator 20 by a line 4, and a second fractionator 60 of fractionating the hydrotreated middle distillate and the hydrocracked wax fraction.

Here, the naphtha fraction is a hydrocarbon fraction with a boiling point of approximately 25° C. or higher and lower than approximately 150° C. (approximately $C_5$ to $C_{10}$), the middle distillate is a hydrocarbon fraction with a boiling point of approximately 150 to 360° C. (approximately $C_{11}$ to $C_{21}$), and the wax fraction is a hydrocarbon fraction with a boiling point of higher than approximately 360° C. (approximately $C_{22}$ or more). In addition, the raw naphtha fraction, the raw middle distillate, and the raw wax fraction mean the respective fractions that are neither hydrotreated nor hydrocracked and contain olefins and oxygen-containing compounds such as alcohols that are impurities (by-products of the FT synthesis reaction) other than saturated aliphatic hydrocarbons (paraffins).

The wax fraction hydrocracking reactor 34 is an apparatus for carrying out the process for producing a hydrocarbon oil of the present embodiment and is preferably packed with the above-described hydrocracking catalyst of the present embodiment as a fixed bed in the inside thereof. The raw wax fraction fed by the line 4 is mixed with an uncracked wax (described later in detail) recycled by a line 13 connected to the line 4 and hydrogen gas fed by a hydrogen gas feed line (not shown) connected to the line 4, heated to a reaction temperature by a heating device (not shown) such as a heat exchanger provided on the line 4, thereafter fed to the wax fraction hydrocracking reactor 34 and hydrocracked.

The middle distillate hydrotreating reactor 32 is preferably packed with a hydrotreating catalyst as a fixed bed. The raw middle distillate fed by the line 3 is mixed with hydrogen gas fed by a hydrogen gas feed line (not shown) connected to the line 3, heated to a reaction temperature by a heating device (not shown) such as a heat exchanger provided on the line 3, thereafter fed to the middle distillate hydrotreating reactor 32 and hydrotreated and hydro-isomerized.

The naphtha fraction hydrotreating reactor 30 is preferably packed with a hydrotreating catalyst as a fixed bed. The raw naphtha fraction fed by the line 2 is mixed with hydrogen gas fed by a hydrogen gas feed line (not shown) connected to the line 2, heated to a reaction temperature by a heating device (not shown) such as a heat exchanger provided on the line 2, thereafter fed to the naphtha fraction hydrotreating reactor 30 and hydrotreated.

The apparatus for producing a hydrocarbon oil 100 comprises gas liquid separators 40, 42, and 44 downstream of the naphtha fraction hydrotreating reactor 30, the middle distillate hydrotreating reactor 32, and the wax fraction hydrocracking reactor 34, respectively, to separate, into gas and liquid, hydrotreated or hydrocracked liquid hydrocarbons discharged from each reactor, and a gas component containing unreacted hydrogen gas and gaseous hydrocarbons. In addition, each gas liquid separator is equipped with an apparatus (not shown) for discharging water produced as by-products during hydrotreating or hydrocracking.

Also, the apparatus for producing a hydrocarbon oil 100 comprises, downstream of the gas liquid separator 40, a naphtha stabilizer 50 of discharging, from a line 8 connected to the top thereof, gaseous hydrocarbons containing hydrocarbons having carbon number of 4 or less as a main component from the hydrotreated naphtha fraction fed through the line 5. Also, a naphtha tank 70 for being fed by a line 9 from the bottom of the naphtha stabilizer 50 with the naphtha fraction from which gaseous hydrocarbons have been removed and storing this is provided therein.

Further, the apparatus for producing a hydrocarbon oil 100 comprises the second fractionator 60 downstream of the gas liquid separator 42 and the gas liquid separator 44, and this second fractionator 60 fractionates a mixture of the hydrotreated middle distillate fed from the gas liquid separator 42 through a line 6 and the hydrocracked wax fraction fed from the gas liquid separator 44 through a line 7. The second fractionator 60 is provided with a line 11 which is connected to the middle portion thereof for discharging the fractionated kerosene fraction and transferring it to a kerosene tank 72, and a line 12 which is connected to the lower portion thereof for discharging the fractionated gas oil fraction and transferring it to a gas oil tank 74. In addition, the line 13 for discharging a bottom oil of the second fractionator 60 containing the uncracked wax, which has not sufficiently be cracked in the wax fraction hydrocracking reactor 34, as a main component, and recycling it to the line 4 upstream of the wax fraction hydrocracking reactor 34 is connected to the bottom of the second fractionator 60. Further, a line 10 of discharging light hydrocarbons containing the naphtha fraction as a main component and feeding it to the naphtha stabilizer 50 is connected to the top of the second fractionator 60.

Next, referring to FIG. 1, one embodiment of the process for producing a hydrocarbon oil of the present invention will be described.

A FT synthetic oil fed from a FT synthesis reaction apparatus (not shown) through a line 1 is fractionated in the first fractionator 20 to a raw naphtha fraction, a raw middle distillate, and a raw wax fraction.

The raw wax fraction discharged from the bottom of the first fractionator 20 by the line 4 is a fraction that has a boiling point of higher than approximately 360° C. (approximately $C_{22}$ or more) and is in a solid state at room temperature. This raw wax fraction is mixed with an uncracked wax (described later in detail) recycled by the line 13 connected to the line 4 and hydrogen gas, heated to a reaction temperature, fed to the wax fraction hydrocracking reactor 34 and hydrocracked.

A mixture of the raw wax fraction and the uncracked wax (hereinafter, also referred to as the "wax for processing") is hydrocracked in the wax fraction hydrocracking reactor 34 and converted to a component corresponding to the middle distillate. In this case, the olefins that are produced as by-products by the FT synthesis reaction and contained in the raw wax fraction are hydrogenated and converted to paraffin hydrocarbons, and the oxygen-containing compounds such as alcohols are hydrogenation deoxidized and converted to paraffin hydrocarbons, water, and the like. Further, the production of isoparaffins by hydro-isomerization of normal paraffins contributing to improving cold flow property (fluidity in a low temperature) as a base stock for fuel oil also proceeds. In addition, a part of the wax for processing excessively undergoes hydrocracking, and is converted to hydrocarbons corresponding to a naphtha fraction with a boiling point lower than that of hydrocarbons with a boiling point range comparable to the middle distillate intended. In addition, a part of the wax for processing is further hydrocracked and converted to gaseous hydrocarbons having carbon number of 4 or less, such as butanes, propane, ethane, and methane. On the other hand, a part of the wax for processing is discharged as the uncracked wax from the wax fraction hydrocracking reactor 34 without being sufficiently hydrocracked.

In the hydrocracking of the wax for processing in the wax fraction hydrocracking reactor 34, it is desirable that a "cracking rate" defined by the following formula (1) be 50 to 90%, preferably 60 to 80%.

Cracking rate(%)=[(mass of hydrocarbons with boiling point of higher than 360° C. in unit mass of wax for processing)−(mass of hydrocarbons with boiling point of higher than 360° C. in unit mass of hydrocracking product)]×100/(mass of hydrocarbons with boiling point of higher than 360° C. in unit mass of wax for processing). (1)

In the case where the cracking rate is lower than 50%, the hydrocracking of the wax for processing is insufficient to reduce the yield of the middle distillate. On the other hand, in the case where the cracking rate is higher than 90%, the hydrocracking of the wax for processing excessively proceeds to raise the production of light hydrocarbons with a boiling point lower than the lower limit in the boiling point range of the middle distillate, thereby reducing the ratio of the middle distillate accounting for the cracking product and thus reducing the yield of the middle distillate.

A method is general in which the cracking rate is controlled by a reaction temperature in the wax fraction hydrocracking reactor 34. Usually, an activity of the hydrocracking catalyst packed in the reactor decreases with the time on stream of the wax fraction hydrocracking reactor 34. Thus, the reactor is usually operated so as to keep the cracking rate constantly by adjusting the reaction temperature. Specifically, an operation is performed to raise the reaction temperature within a range that compensates for the activity of the hydrocracking catalyst decreased with the time on stream and is therefore appropriate to the decrease in activity.

In the present application, the "uncracked wax" refers to one in which hydrocracking does not proceed until the boiling point becomes 360° C. or lower in the wax for processing. The uncracked wax is separated as a bottom oil in the second fractionator 60 described later and recycled to the wax fraction hydrocracking reactor 34. In addition, the "hydrocracking product" means all products comprising the uncracked wax discharged from the wax fraction hydrocracking reactor 34, unless otherwise noted.

The reaction temperature in the wax fraction hydrocracking reactor 34 (weight average catalyst bed temperature) is appropriately selected according to the set cracking rate and reduction in the activity of the hydrocracking catalyst along with the time on stream, and examples thereof can include 180° C. to 400° C., preferably 200° C. to 370° C., more preferably 250° C. to 350° C., and further preferably 280° C. to 350° C. If the reaction temperature is higher than 400° C., the hydrocracking excessively proceeds to thereby raise the production of the light fraction, and the yield of the middle distillate intended tends to be reduced. Further, the hydrocracking product is colored and is limited to be used as a base stock for fuel in some cases. On the other hand, if the reaction temperature is lower than 180° C., the hydrocracking of the wax fraction does not proceed sufficiently, and the yield of the middle distillate tends to be reduced. Further, the olefins and the oxygen-containing compounds such as alcohols in the wax fraction tend not to be sufficiently removed.

A hydrogen partial pressure in the wax fraction hydrocracking reactor 34 is for example 0.5 to 12 MPa, and 1.0 to 5.0 MPa is preferable.

A liquid hourly space velocity (LHSV) in the wax fraction hydrocracking reactor 34 is for example 0.1 to 10.0 h$^{-1}$, and 0.3 to 3.5 h$^{-1}$ is preferable. A ratio of the hydrogen gas and the wax fraction (a ratio of hydrogen gas/oil) is not particularly limited, but it is for example 50 to 1000 NL/L, and 70 to 800 NL/L is preferable. Here, the "NL" means a hydrogen capacity (L) at the normal state (0° C., 101325 Pa). In the case where the ratio of hydrogen gas/oil is lower than 50 NL/L, the proceed of hydrocracking tends to be insufficient; on the other hand, in the case where the ratio of hydrogen gas/oil is higher than 1000 NL/L, a large-sized feeding source of hydrogen gas tends to be needed.

The hydrocracking product discharged from the wax fraction hydrocracking reactor 34 is separated into gas and liquid in the gas liquid separator 44. Specifically, a gas component comprising unreacted hydrogen gas and hydrocarbon gas of mainly $C_4$ or less is separated from a liquid component that is a hydrocarbon oil with a carbon number distribution corresponding to from the naphtha fraction to the uncracked wax. The separated gas component is reused in the hydroprocessing reaction. The liquid component is mixed with the hydrotreated middle distillate fed from the middle distillate hydrotreating reactor 32 through the gas liquid separator 42, and fed to the second fractionator 60.

Although the gas liquid separator 44 is indicated as a single vessel in FIG. 1, a multi-stage gas liquid separation apparatus comprising a plurality of coolers and separators is preferable. By performing gas liquid separation with such an apparatus, due to solidification of the uncracked wax contained in the hydrocracking product by rapid cooling, troubles such as a clogged apparatus and the like can be prevented.

In the second fractionator 60, liquid hydrocarbons discharged from the wax fraction hydrocracking reactor 34 are fractionated together with the hydrotreated middle distillate fed from the middle distillate hydrotreating reactor 32, and a bottom oil containing the uncracked wax as a main component is discharged from the bottom thereof. The bottom oil is recycled by the line 13 to the line 4, and the uncracked wax is mixed with the raw wax fraction, fed again to the wax fraction hydrocracking reactor 34 and hydrocracked. By thus maintaining the cracking rate at the predetermined level and performing the operation of hydrocracking the uncracked wax again, raise in the production of the light fraction attributed to the excessive hydrocracking of the wax for processing can be suppressed, and the yield of the middle distillate can be improved.

In the wax fraction hydrocracking reactor 34, as described above, hydrocracking is performed at the predetermined cracking rate in order to raise the yield of the middle distillate. On the other hand, when the wax for processing is hydrocracked at the cracking rate as described above, a part of the wax for processing inevitably undergoes excessive hydrocracking and is converted to the light fraction (naphtha fraction or $C_4$ or less gaseous hydrocarbons) with a boiling point of less than the lower limit of the boiling point range (approximately 150 to 360° C.) of the middle distillate. Thus, if the predetermined cracking rate is maintained and the excessive hydrocracking can be suppressed, the yield of the middle distillate is improved. Namely, a hydrocracking catalyst is demanded in which the activity for hydrocracking is high and the activity for excessive hydrocracking is suppressed.

The conventional hydrocracking catalyst, which comprises a zeolite and an amorphous composite metal oxide having solid acidity as a catalyst support and comprises at least one active metal supported by the catalyst support and selected from noble metals of Group 8 to Group 10 in the periodic table, is a catalyst having such properties. However, in general, an activity of the hydrocracking catalyst tends to decrease with the time on stream of a wax fraction hydrocracking reactor. Particularly, in the case of starting the operation of the apparatus packed with a new catalyst, the proceed of reduction in the activity of the hydrocracking catalyst is remarkable in the early stage of the operation up to about 500 hours after starting of the operation, and the activity of the catalyst tends to become relatively stable and show slow reduction, entering a period subsequent to this early stage of the operation (stable phase of the catalyst). Thus, as the hydrocracking catalyst, a catalyst is demanded in which the activity for hydrocracking is maintained at a relatively high level in this stable phase of the catalyst and the activity for excessive hydrocracking is suppressed, but the conventional catalyst does not always satisfy this demanded performance, and reduction in hydrocracking activity is large and middle distillate selectivity described later reduces.

On the other hand, by having the above-described particular configuration, the hydrocracking catalyst of the present embodiment has a relatively high cracking activity and a suppressed activity for excessive hydrocracking in the stable phase of the catalyst. Therefore, the hydrocracking catalyst of the present embodiment can give the predetermined cracking rate at a relatively low reaction temperature in the stable phase of the catalyst and give a relatively high middle distillate selectivity, and the middle distillate can be obtained with a high yield.

Here, the middle distillate selectivity is defined by the following formula (2).

Middle distillate selectivity(%)=[(mass of hydrocarbons with boiling point of 150 to 360° C. in unit mass of hydrocracking product)−(mass of hydrocarbons with boiling point of 150 to 360° C. in unit mass of wax for processing)]×100/[(mass of hydrocarbons with boiling point of higher than 360° C. in unit mass of wax for processing)−(mass of hydrocarbons with boiling point of higher than 360° C. in unit mass of hydrocracking product)]  (2)

Although the mechanism of effect under which such features possessed by the hydrocracking catalyst of the present embodiment are exerted is not clarified, the present inventors presume it as follows. Namely, the hydrocracking catalyst has two functions, that is, a hydrogenation activity by the active metal and solid acidity possessed by the catalyst support. With regard to active sites (acid sites) exhibiting solid acidity on the catalyst support, properties (acidity, for example) as a solid acid are not uniform and have a distribution. It can be considered that an acid site mainly catalyzing moderate hydrocracking that gives the desired middle distillate and an acid site mainly catalyzing undesirable excessive hydrocracking are included in these acid sites. On the other hand, the organic matter-derived carbonaceous substance containing a carbon atom contained in the catalyst is considered to inhibit the catalytic action possessed by the acid sites on the catalyst support. In the hydrocracking catalyst of the present embodiment, 0.05 to 1% by mass of the carbonaceous substance in terms of the carbon atom is contained, and this carbonaceous substance is presumed to thereby exert the inhibitory effect more selectively on the above-described acid site catalyzing excessive hydrocracking compared with the acid site catalyzing moderate hydrocracking when exerting the inhibitory effect on the acid sites on the catalyst support. As a result, it is considered that the activity for excessive hydrocracking is suppressed in a manner relative to the activity for moderate hydrocracking to give a relatively higher middle distillate selectivity than that of the conventional catalyst at the predetermined cracking rate. As a result, the hydrocracking catalyst of the present embodiment can presumably obtain a high yield of the middle distillate compared with the conventional hydrocracking catalyst. In addition, the reason why a high middle distillate selectivity can be maintained even in the stable phase of the catalyst is presumed as follows. Namely, a hydrocracking catalyst containing a carbonaceous substance in an amount less than 0.05% by mass easily produces a new carbonaceous substance in the early stage of the operation. This newly produced carbonaceous substance inhibits even the acid site catalyzing moderate hydrocracking, and therefore, the middle distillate selectivity also reduces as the hydrocracking activity reduces. On the other hand, the hydrocracking catalyst of the present embodiment newly produces a few carbonaceous substances in the early stage of the operation, and therefore, it is considered that reduction in hydrocracking activity and reduction in middle distillate selectivity are small in the early stage of the operation and this is also maintained in the stable phase.

The raw middle distillate discharged by the line 3 from the middle portion of the first fractionator 20 is a fraction comprising a mixture of hydrocarbons with a boiling point of approximately 150 to 360° C. (approximately $C_{11}$ to $C_{21}$), and contains straight-chain saturated aliphatic hydrocarbons with the boiling point range as a main component and contains olefins and oxygen-containing compounds such as alcohols that are by-products of the FT synthesis reaction, as impurities.

The raw middle distillate is mixed with hydrogen gas, thereafter heated to a reaction temperature and fed to the middle distillate hydrotreating reactor 32. The reactor is packed with a hydrotreating catalyst, and the mixture of the raw middle distillate and hydrogen gas comes into contact with the catalyst, thereby proceeding hydrotreating and hydro-isomerization of the raw middle distillate to proceed.

The hydrotreating of the raw middle distillate is a reaction that removes impurities (olefins and oxygen-containing compounds such as alcohols) contained in the raw middle distillate. The olefins (unsaturated aliphatic hydrocarbons) are hydrogenated and converted to saturated aliphatic hydrocarbons (paraffins). In addition, the oxygen-containing compounds such as alcohols are hydro-deoxidized and converted to saturated aliphatic hydrocarbons, water, and the like. By this hydrotreating, the impurities, which may adversely affect constituent materials of engines if contained in fuel oils, can be removed.

Hydro-isomerization converts straight-chain saturated aliphatic hydrocarbons (normal paraffins) to branched-chain saturated hydrocarbons (isoparaffins) by skeletal isomerization. By the hydro-isomerization, the content of normal paraffins in the middle distillate is reduced, while the content of isoparaffins is raised, thereby reducing the crystallinity of the paraffins and thus improving cold flow property as a fuel oil.

As the hydrotreating catalyst packed into the middle distillate hydrotreating reactor 32, a known hydrotreating catalyst can be used. Examples of the known hydrotreating catalyst include catalysts comprising a catalyst support comprising an amorphous composite metal oxide having solid acidity and at least one active metal supported by the catalyst support and selected from noble metals of Group 8 to Group 10 in the periodic table.

The amorphous composite metal oxide having solid acidity that constitutes the catalyst support is, for example, a composite metal oxide comprising a combination of 2 or 3 or more selected from metal oxide units such as alumina, silica, titania, zirconia, boria, and magnesia, and specific examples thereof include silica alumina, silica zirconia, alumina boria, alumina zirconia, silica titania, and silica magnesia. Among these, silica alumina, silica zirconia, and alumina boria are preferable, and silica zirconia is more preferable.

The catalyst support may contain a small amount of zeolite. In this case, examples of preferable zeolite include ultra stable Y-type (USY) zeolite, Y-type zeolite, mordenite, and beta zeolite. In this case, the ratio of the zeolite to the mass of the catalyst support is not particularly limited, but it is 0.5 to 10% by mass, and preferably 1 to 5% by mass.

In order to enhance the moldability and mechanical strength of the catalyst support, a binder may be further compounded in the catalyst support. Examples of a preferable binder include alumina, silica, and magnesia. In the case of compounding the binder in the catalyst support, the amount thereof to be compounded is not particularly limited, but it is 20 to 98% by mass, and preferably 30 to 96% by mass based on the entire mass of the catalyst support.

The catalyst support is preferably molded. Examples of the shape of the molded catalyst support include, but not particularly limited to, a sphere, a cylinder, an irregular cylinder having a trilobes or quadrolobes, and a disc. A method for molding the catalyst support is not limited, and a known method such as extrusion molding or compression molding is used. The molded catalyst support is usually calcined.

The noble metals of Group 8 to Group 10 in the periodic table as the active metal that constitutes the hydrotreating catalyst are ruthenium and osmium as noble metals of Group 8, rhodium and iridium as noble metals of Group 9, and palladium and platinum as noble metals of Group 10. Among these, a preferable noble metal is platinum or palladium, and more preferably platinum. In addition, a combination of platinum-palladium is also preferably used.

As the content of the active metal supported by the catalyst support, 0.1 to 3% by mass in terms of the metal atom based on the mass of the catalyst support is preferable. In the case where the content of the active metal is less than the lower limit value, hydrotreating and hydro-isomerization tend not to sufficiently proceed. On the other hand, in the case where the content of the active metal is more than the upper limit value, dispersion of the active metal tends to be reduced to reduce the activity of the catalyst, and cost of the catalyst is increased.

As the hydrotreating catalyst packed into the middle distillate hydrotreating reactor 32, the hydrocracking catalyst of the present embodiment may be used. Since the middle distillate with a small number of carbon atoms compared with the wax fraction is relatively unsusceptible to hydrocracking, the production of the light fraction attributed to hydrocracking is not significant even using the hydrocracking catalyst of the present embodiment.

A reaction temperature in the middle distillate hydrotreating reactor 32 is 180 to 400° C., preferably 200 to 370° C., more preferably 250 to 350° C., and particularly preferably 280 to 340° C. Here, the reaction temperature refers to the weight average temperature of a catalyst bed in the middle distillate hydrotreating reactor 32. If the reaction temperature is higher than 400° C., not only cracking into the light fraction tends to proceed to reduce the yield of the middle distillate, but also the product tends to be colored and to be restricted to use as the base stock for fuel oil. On the other hand, if the reaction temperature is lower than 180° C., oxygen-containing compounds such as alcohols tend not to sufficiently be removed to remain, and production of isoparaffins by the hydro-isomerization reaction tends to be suppressed.

A pressure (hydrogen partial pressure) in the middle distillate hydrotreating reactor 32 is preferably 0.5 to 12 MPa, and more preferably 1 to 5 MPa. In the case where the pressure is lower than 0.5 MPa, hydrotreating and hydro-isomerization tend not to sufficiently proceed; on the other hand, in the case where the pressure is higher than 12 MPa, high pressure resistance is demanded for the apparatus, and facility cost tends to be increased.

A liquid hourly space velocity (LHSV) in the middle distillate hydrotreating reactor 32 is preferably 0.1 to 10 h$^{-1}$, and more preferably 0.3 to 3.5 h$^{-1}$. In the case where the LHSV is lower than 0.1 h$^{-1}$, cracking into the light fraction tends to proceed to reduce the yield of the middle distillate, and productivity tends to be reduced; on the other hand, in the case where the LHSV is higher than 10.0 h$^{-1}$, hydrotreating and hydro-isomerization tend not to sufficiently proceed.

A ratio of hydrogen gas/oil in the middle distillate hydrotreating reactor 32 is preferably 50 to 1000 NL/L, and more preferably 70 to 800 NL/L. Here, the "NL" means a hydrogen capacity (L) at the normal state (0° C., 101325 Pa). In the case where the ratio of hydrogen gas/oil is lower than 50 NL/L, hydrotreating and hydro-isomerization tend not to sufficiently proceed; on the other hand, in the case where the ratio of hydrogen gas/oil is higher than 1000 NL/L, a large-sized hydrogen feeding apparatus and the like tend to be needed.

The product discharged from the middle distillate hydrotreating reactor 32 is introduced into the gas liquid separator 42 by which a liquid product (liquid hydrocarbons) is separated from a gas component containing unreacted hydrogen gas and gaseous hydrocarbons as main components. The liquid hydrocarbons (hydrotreated middle distillate) are introduced in the second fractionator 60 downstream thereof, and the gas component is reused in the hydroprocessing reaction.

The raw naphtha fraction discharged from the top of the first fractionator 20 by the line 2 is a fraction comprising liquid hydrocarbons with a boiling point of lower than approximately 150° C. (approximately $C_5$ to $C_{10}$), and contains a straight-chain saturated aliphatic hydrocarbons with the boiling point range as a main component and contains olefins and oxygen-containing compounds such as alcohols that are by-products of the FT synthesis reaction, as impurities. The raw naphtha fraction is mixed with hydrogen gas, heated to a reaction temperature, fed to the naphtha fraction hydrotreating reactor 30 and hydrotreated.

As the hydrotreating catalyst packed into the naphtha fraction hydrotreating reactor 30, a known hydrotreating catalyst can be used, and, for example, a catalyst similar to the above-described hydrotreating catalyst packed into the middle distillate hydrotreating reactor 32 may be used. In the naphtha fraction hydrotreating reactor 30, the olefins contained in the raw naphtha fraction are converted to saturated hydrocarbons by hydrogenation, and the oxygen-containing compounds such as alcohols are converted to hydrocarbons, water, and the like by hydrogenation deoxidation. The raw naphtha fraction is hydrocarbons having carbon number of approximately 10 or less, and rare occurrences of hydro-isomerization and hydrocracking as its characteristics.

In the raw naphtha fraction, the olefins and the oxygen-containing compounds such as alcohols are contained at relatively high concentrations, and the large heat of reaction is produced in the hydrotreating reaction that converts these to saturated hydrocarbons. Thus, if only the raw naphtha fraction is subjected to hydrotreating, there is the case where the temperature of the naphtha fraction excessively rises in the naphtha fraction hydrotreating reactor 30. Thus, it is preferable that a portion of the hydrotreated naphtha fraction discharged from the naphtha fraction hydrotreating reactor 30 be recycled by a line 14 to the line 2 upstream of the naphtha fraction hydrotreating reactor 30, thereby diluting the raw naphtha fraction with the already-refined naphtha fraction and then subjecting it to hydrotreating.

A reaction temperature in the naphtha fraction hydrotreating reactor 30 is 180 to 400° C., preferably 280 to 350° C., and more preferably 300 to 340° C. Here, the reaction temperature refers to the average temperature of a catalyst bed in the naphtha fraction hydrotreating reactor 30. When the reaction temperature is the lower limit temperature or higher, the raw naphtha fraction is sufficiently hydrotreated, and when the reaction temperature is the upper limit temperature or lower, reduction in the life of the catalyst is suppressed.

A pressure (hydrogen partial pressure) in the naphtha fraction hydrotreating reactor 30 is preferably 0.5 to 12 MPa, and more preferably 1 to 5 MPa. When the pressure is 0.5 MPa or more, the raw naphtha fraction is sufficiently hydrotreated, and when the pressure is 12 MPa or less, facility cost for enhancing the pressure resistance of the facility can be reduced.

A liquid hourly space velocity (LHSV) in the naphtha fraction hydrotreating reactor 30 is preferably 0.1 to 10 h$^{-1}$, and more preferably 0.3 to 3.5 h$^{-1}$. When the LHSV is 0.1 h$^{-1}$ or higher, the capacity of the reactor does not have to be excessively large, and when the LHSV is 10 h$^{-1}$ or lower, the raw naphtha fraction is efficiently hydrotreated.

A ratio of hydrogen gas/oil in the naphtha fraction hydrotreating reactor 30 is preferably 50 to 1000 NL/L, and more preferably 70 to 800 NL/L. Here, the "NL" means a hydrogen capacity (L) at the normal state (0° C., 101325 Pa). When the ratio of hydrogen gas/oil is 50 NL/L or higher, the raw naphtha fraction is sufficiently hydrotreated, and when the ratio of hydrogen gas/oil is 1000 NL/L or lower, a facility for feeding a large amount of hydrogen gas becomes unnecessary, and an increase in operation cost can be suppressed.

The produced oil discharged from the naphtha fraction hydrotreating reactor 30 is separated in the gas liquid separator 40 into gas and liquid as a gas component containing unreacted hydrogen gas as a main component and liquid hydrocarbons. The gas component is reused in the hydroprocessing reaction, and the liquid hydrocarbons are fed through the line 5 to the naphtha stabilizer 50 by which $C_4$ or less gaseous hydrocarbons are then removed from the line 8 and the naphtha fraction consisting mainly of $C_5$ to $C_{10}$ is stored into the naphtha tank 70 through the line 9.

In the second fractionator 60, a plurality of cut points are set depending on the hydrocarbon oil to be discharged, so that a mixed oil of the hydrotreated middle distillate fed from the middle distillate hydrotreating reactor 32 and the hydrocracked wax fraction fed from the wax fraction hydrocracking reactor 34 is fractionated.

In the present embodiment, the cut points are set at 150° C., 250° C., and 360° C. From the top of the second fractionator 60, the light fraction containing the naphtha fraction is discharged by the line 10 and fed to the naphtha stabilizer 50 by which $C_4$ or less hydrocarbon gas is then removed to store product naphtha into the naphtha tank 70. From the middle portion of the second fractionator 60, the kerosene fraction is discharged by the line 11 and stored in the kerosene tank 72. From the lower portion of the second fractionator 60, the gas oil fraction is discharged by the line 12 and stored in the gas oil tank 74. From the bottom of the second fractionator 60, the bottom oil containing the uncracked wax as a main component is discharged by the line 13, recycled to the line 4, fed to the wax fraction hydrocracking reactor 34 together with the raw wax fraction and hydrocracked again.

In this way, the gas oil fraction, the kerosene fraction, and the naphtha fraction are obtained.

The process for producing a hydrocarbon oil of the present invention is not limited to an example of the above-described embodiment, and various alterations, substitutions, additions and the like can be made without departing from the spirit of the present invention.

For example, in the above-described embodiment, an embodiment is adopted in which the FT synthetic oil fed from the FT synthesis reaction apparatus is fractionated in the first fractionator 20 to a raw naphtha fraction, a raw middle distillate, and a raw wax fraction, but in this fractionation, the raw naphtha fraction and the raw middle distillate may be collected as one fraction as a raw naphtha/middle distillate. Then, the raw naphtha/middle distillate may be subjected to hydrotreating in a single hydrotreating reactor.

Further, the FT synthetic oil may be fractionated, without being fractionated in the first fractionator 20, by gas liquid separation at a temperature in the FT synthesis reaction apparatus into light liquid hydrocarbons by cooling and liquefying light hydrocarbons that are in a gas state at the temperature, and heavy liquid hydrocarbons that are in a liquid state at the temperature. Then, without providing the naphtha fraction hydrotreating reactor 30, the light liquid hydrocarbons are subjected to hydrotreating in the middle distillate hydrotreating reactor 32, and the heavy liquid hydrocarbons may be subjected to hydrocracking in the wax fraction hydrocracking reactor 34.

In addition, in the above-described embodiment, an embodiment is adopted in which a mixture of the hydrotreated middle distillate discharged from the middle distillate hydrotreating reactor 32 and the hydrocracking product of the wax fraction discharged from the wax fraction hydrocracking reactor 34 is fractionated in the second fractionator 60, but not limited to this, and, for example, the hydrotreated middle distillate discharged from the middle distillate hydrotreating reactor 32 and the hydrocracking product of the wax fraction discharged from the wax fraction hydrocracking reactor 34 may separately be fractionated in the respective fractionators.

Further, in the above-described embodiment, the naphtha fraction, the kerosene fraction, and the gas oil fraction are obtained as products, but the kerosene fraction and the gas oil fraction may be obtained as one fraction (middle distillate).

EXAMPLES

Hereinafter, the present invention will be described in more detail by Examples, but it is not to be limited to the following Examples.

Example 1

Preparation of Hydrocracking Catalyst

Starch was compounded as a molding additives at 5% by mass based on the total mass of silica alumina (as dry mass), alumina, and USY zeolite in a composition containing 30% by mass of silica alumina gel as dry mass, 60% by mass of powdered alumina (binder), and 10% by mass of powdered USY zeolite (average particle size: 0.4 μm, molar ratio of silica/alumina (molar ratio of silica to alumina): 32), water was further added thereto, and kneading into a clay-like form was performed to prepare a kneaded mixture. This kneaded mixture was molded by extrusion molding into a cylinder with a diameter of about 1.5 mm and a length of about 3 mm. The obtained mold was dried at 120° C. for 3 hours and further calcined in air at 450° C. for 3 hours to obtain a catalyst support. As a result of measuring the content of a residue containing the starch-derived carbon atom contained in this catalyst support using the carbon/sulfur analyzer EMIA-920V produced by Horiba, Ltd., it was 1.1% by mass in terms of the carbon atom based on the mass of the catalyst support.

This catalyst support was impregnated by an incipient wetness method with an aqueous solution of dichlorotetraammine platinum (II) to be 0.8% by mass as a platinum atom based on the mass of the catalyst support and further dried at 120° C. for 3 hours to obtain a catalyst precursor.

Next, the catalyst precursor was calcined. The catalyst precursor was charged into a heating furnace, heated to 300° C. under an air atmosphere, then heated at heating rate of 10° C./h between 300 and 400° C., and then calcined at 500° C. for 1 hour to obtain a hydrocracking catalyst. As a result of quantifying the carbonaceous substance in the obtained hydrocracking catalyst using the above-described carbon/sulfur analyzer, it was 0.05% by mass in terms of the carbon atom based on the mass of the catalyst.

<Production of Hydrocarbon Oil>

The hydrocracking catalyst obtained above was packed in a fixed bed flow reactor, and reduced under a stream of hydrogen at 340° C. for 4 hours to be activated.

Next, a FT synthetic oil obtained by a FT synthesis reaction was fractionated in a fractionator to obtain a bottom oil (raw wax fraction) of the fractionator with a boiling point of higher than 360° C. As a result of examining its carbon distribution by distillation/gas chromatograph, it was in the range of $C_{22}$ to $C_{82}$. Hydrocracking was performed with this raw wax fraction as a raw oil.

The raw oil was fed together with hydrogen gas to the fixed bed flow reactor packed with the hydrocracking catalyst to perform hydrocracking. The hydrocracking product discharged from the reactor was cooled, unreacted hydrogen gas and gaseous hydrocarbons of mainly $C_4$ or less were separated by a gas liquid separator, and liquid hydrocarbons were fed to a fractionator and fractionated with the cut points being 150° C. and 360° C. Then, the entire bottom oil of the fractionator was recycled to a line of feeding the raw oil to the reactor. The reaction conditions were set to a reaction pressure (pressure of hydrogen gas) of 3.0 MPa, LHSV of 2.0 $h^{-1}$, and a ratio of hydrogen-oil of 340 NL/L. The hydrocracking product (before fractionation) discharged from the reactor was analyzed by gas chromatograph, and a cracking rate defined by the formula (1) and middle distillate selectivity defined by the formula (2) were calculated. Further, a reaction temperature was adjusted so that the cracking rate became 70%. Since an activity of the hydrocracking catalyst decreases with the time on stream, the operation was continued with the reaction temperature adjusted so that the cracking rate was maintained at 70% for each operation time.

A reaction temperature for the cracking rate being 70% when 2000 hours elapsed after starting of the operation was 319° C., and in this case, the middle distillate selectivity was 78% by mass. The results are shown in Table 1.

It is to be noted that the yield of the middle distillate is calculated by multiplying the cracking rate (70%) by the middle distillate selectivity.

Example 2

Preparation of Hydrocracking Catalyst

A hydrocracking catalyst was obtained in the same way as in Example 1 except that in the calcining of the catalyst precursor, the calcining temperature and the calcining time after the heating were set to 490° C. and 0.5 hour, respectively. The content of the carbonaceous substance in the hydrocracking catalyst was 0.5% by mass in terms of the carbon atom.

<Production of Hydrocarbon Oil>

Hydrocracking of the FT synthetic oil-derived raw wax fraction was performed in the same way as in Example 1 except that the hydrocracking catalyst obtained above was used. A reaction temperature for the cracking rate being 70% when an operation time of 2000 hours elapsed was 317° C., and in this case, the middle distillate selectivity was 81% by mass. The results are shown in Table 1.

Figure 2:
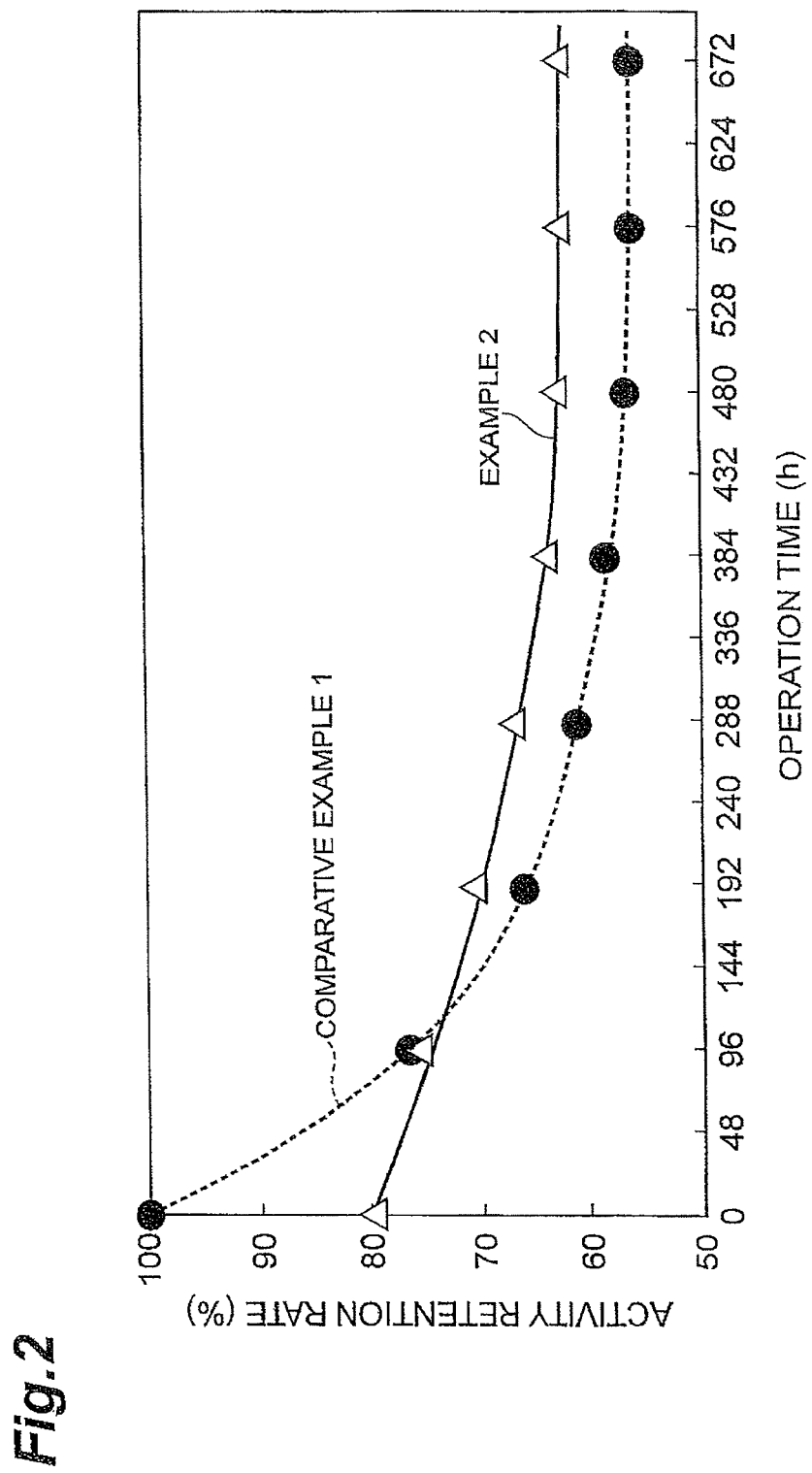
FIG. 2 is a graph showing the trend in activities of hydrocracking catalysts of Example 2 and Comparative Example 1 over time in the hydrocracking of a wax fraction.

In addition, the trend in activity of the hydrocracking catalyst over time from the early stage of the operation (from the start of the operation to the passage of about 670 hours) to the stable phase of the catalyst is shown in FIG. 2. The "activity retention rate" of the ordinate in FIG. 2 is an indication with the activity of a hydrocracking catalyst in Comparative Example 1 described later at the start of the operation as 100. It is to be noted that the activity retention rate was calculated by calculating a relative activity using the Arrhenius equation from a reaction temperature for the cracking rate being 70% for each operation time and further comparing the relative activity with that of the hydrocracking catalyst of Comparative Example 1 at the start of the operation.

Example 3

Preparation of Hydrocracking Catalyst

A hydrocracking catalyst was obtained in the same way as in Example 1 except that in the calcining of the catalyst precursor, the calcining temperature and the calcining time after the heating were set to 480° C. and 0.5 hour, respectively. The content of the carbonaceous substance in the hydrocracking catalyst was 0.8% by mass in terms of the carbon atom.

<Production of Hydrocarbon Oil>

Hydrocracking of the FT synthetic oil-derived raw wax fraction was performed in the same way as in Example 1 except that the hydrocracking catalyst obtained above was used. A reaction temperature for the cracking rate being 70% when an operation time of 2000 hours elapsed was 327° C., and in this case, the middle distillate selectivity was 82% by mass. The results are shown in Table 1.

Example 4

Preparation of Hydrocracking Catalyst

A kneaded mixture was prepared from silica alumina gel, alumina, USY zeolite, water, and starch in the same way as in Example 1, and this kneaded mixture was extrusion molded and dried to obtain a mold. This mold was calcined in air at 550° C. for 3 hours to obtain a catalyst support. As a result of measuring the content of a residue containing the starch-derived carbon atom contained in this catalyst support in the same way as in Example 1, the carbon atom was not detected (content in terms of the carbon atom was 0.02% by mass or less).

Dichlorotetraammine platinum (II) was supported by the catalyst support thus obtained in the same way as in Example 1 and dried to obtain a catalyst precursor.

This catalyst precursor was calcined at 500° C. for 1 hour to temporarily obtain a catalyst (referred to as the "preliminary catalyst").

Next, this preliminary catalyst was dipped in a gas oil fraction obtained by hydrotreating and fractionating a FT synthetic oil separately. Then, the preliminary catalyst was discharged from the gas oil fraction, and a deoiling treatment was performed in a stream of nitrogen at 300° C. for 3 hours.

Next, the preliminary catalyst after the deoiling treatment was charged into a heating furnace, heated to 300° C. under an air atmosphere, then heated at a heating rate of 10° C./h between 300 and 400° C., and then calcined at 450° C. for 0.8 hour to obtain a hydrocracking catalyst. The content of the carbonaceous substance in this hydrocracking catalyst was 0.5% by mass in terms of the carbon atom.

<Production of Hydrocarbon Oil>

Hydrocracking of the FT synthetic oil-derived raw wax fraction was performed in the same way as in Example 1 except that the hydrocracking catalyst obtained above was used. A reaction temperature for the cracking rate being 70% when an operation time of 2000 hours elapsed was 318° C., and in this case, the middle distillate selectivity was 80% by mass. The results are shown in Table 2.

Comparative Example 1

Preparation of Hydrocracking Catalyst

A kneaded mixture was prepared from silica alumina gel, alumina, USY zeolite, water, and starch in the same way as in Example 1, and this kneaded mixture was extrusion molded and dried to obtain a mold. This mold was calcined in air at 550° C. for 3 hours to obtain a catalyst support. Dichlorotetraammine platinum (II) was supported by the catalyst support thus obtained in the same way as in Example 1 and dried to obtain a catalyst precursor.

This catalyst precursor was calcined under an air atmosphere at 500° C. for 1 hour to obtain a hydrocracking catalyst. As a result of measuring the content of the carbonaceous substance in this hydrocracking catalyst, it was the detection limit as the carbon atom (content in terms of the carbon atom was 0.02% by mass or less).

<Production of Hydrocarbon Oil>

Hydrocracking of the FT synthetic oil-derived raw wax fraction was performed in the same way as in Example 1 except that the hydrocracking catalyst obtained above was used. A reaction temperature for the cracking rate being 70% when an operation time of 2000 hours elapsed was 325° C., and in this case, the middle distillate selectivity was 72% by mass. The results are shown in Table 1.

In addition, the trend in activity of the hydrocracking catalyst over time from the early stage of the operation (from the start of the operation to the passage of about 670 hours) to the stable phase of the catalyst is shown in FIG. 2. The "activity retention rate" of the ordinate is as described in Example 2.

Comparative Example 2

Preparation of Hydrocracking Catalyst

A hydrocracking catalyst was obtained by operation similar to that in Example 4 except that the calcining of the preliminary catalyst dipped in the gas oil fraction and subjected to the deoiling treatment was performed at 440° C. for 0.7 hour after heating. The content of the carbonaceous substance in this hydrocracking catalyst was 1.3% by mass in terms of the carbon atom.

<Production of Hydrocarbon Oil>

Hydrocracking of the FT synthetic oil-derived raw wax fraction was performed in the same way as in Example 1 except that the hydrocracking catalyst obtained above was used. A reaction temperature for the cracking rate being 70% when an operation time of 2000 hours elapsed was 335° C., and in this case, the middle distillate selectivity was 80% by mass. The results are shown in Table 2.

TABLE 1

|  | Example 1 | Example 2 | Example 3 | Comparative Example 1 |
|---|---|---|---|---|
| Catalyst precursor calcining temperature (° C.) | 500 | 490 | 480 | 500* |
| Catalyst precursor calcining time (h) | 1 | 0.5 | 0.5 | 1* |
| Carbonaceous substance content in catalyst (% by mass) | 0.05 | 0.5 | 0.8 | 0.02 or less |
| Reaction temperature at which cracking rate became 70% (° C.) | 319 | 317 | 327 | 325 |
| Middle distillate selectivity (% by mass) | 78 | 81 | 82 | 72 |

*Catalyst support calcining conditions differed from Examples 1 to 3 (450° C., 3 hours) and were 550° C., 3 hours.

TABLE 2

|  | Example 4 | Comparative Example 2 |
|---|---|---|
| Gas oil-dipped/deoiled preliminary catalyst calcining temperature (° C.) | 450 | 440 |
| Gas oil-dipped/deoiled preliminary catalyst calcining time (h) | 0.8 | 0.7 |
| Carbonaceous substance content in catalyst (% by mass) | 0.5 | 1.3 |
| Reaction temperature at which cracking rate became 70% (° C.) | 318 | 335 |
| Middle distillate selectivity (% by mass) | 80 | 80 |

From the results of Table 1 and Table 2, it was revealed that in the hydrocracking of the wax fraction using the hydrocracking catalysts of Examples 1 to 4 in which the content of the organic compound-derived carbonaceous substance was 0.05 to 1% by mass in terms of the carbon atom, a high selectivity, that is, a high yield of the middle distillate, compared with the case using the hydrocracking catalyst of Comparative Example 1 in which the content of the carbonaceous substance was less than 0.05% by mass can be obtained at the same cracking rate. In addition, the hydrocracking catalyst of Comparative Example 2 in which the content of the carbonaceous substance was more than 1% by mass gives a relatively high middle distillate selectivity at the same cracking rate, but a reaction temperature for obtaining the same cracking rate is high and thus becomes a problem in terms of the life of the catalyst.

Moreover, from the results of Table 2, the hydrocracking catalyst of Comparative Example 1 in which the content of the carbonaceous substance was less than 0.05% by mass has a high activity at the start of the operation, but reduction in activity over time is large in the early stage of the operation. On the other hand, the hydrocracking catalyst of Example 2 according to the present invention has a small activity at the start of the operation compared with the hydrocracking catalyst of Comparative Example 1 in which the content of the carbonaceous substance was less than 0.05% by mass, but reduction in activity over time is smaller in the early stage of the operation, and rather, the activity of the hydrocracking catalyst of Example 2 is higher in the stable phase of the catalyst compared with the hydrocracking catalyst of Comparative Example 1.

INDUSTRIAL APPLICABILITY

According to the present invention, a middle distillate can be obtained with a high yield from a hydrocarbon raw oil containing a wax fraction.

Reference Signs List

20 ... First fractionator, 30 ... Naphtha fraction hydrotreating reactor, 32 ... Middle distillate hydrotreating reactor, 34 ... Wax fraction hydrocracking reactor, 60 ... Second fractionator, 100 ... Apparatus for producing a hydrocarbon oil.

The invention claimed is:

1. A hydrocracking catalyst comprising a catalyst support comprising a zeolite and an amorphous composite metal oxide having solid acidity, and at least one active metal supported by the catalyst support and selected from noble metals of Group 8 to Group 10 in the periodic table, wherein the hydrocracking catalyst contains a carbonaceous substance comprising a carbon atom, which is produced by calcining or heating the zeolite and the amorphous composite metal oxide having solid acidity that constitute the catalyst support or a precursor of the hydrocracking catalyst by raising the temperature at a rate of 1 to 50° C./h to a predetermined temperature, and the content of the carbonaceous substance in the hydrocracking catalyst is 0.05 to 1% by mass in terms of the carbon atom.

2. The hydrocracking catalyst according to claim 1, wherein the zeolite is ultrastable Y-type zeolite.

3. The hydrocracking catalyst according to claim 1, wherein the amorphous composite metal oxide is at least one selected from silica alumina, alumina boria, and silica zirconia.

4. The hydrocracking catalyst according to claim 1, wherein the active metal is platinum.

5. A process for producing a hydrocarbon oil, comprising contacting a raw oil comprising 70% by mass or more of straight-chain aliphatic hydrocarbons with a boiling point of higher than 360° C., with a hydrocracking catalyst according to claim 1 in the presence of molecular hydrogen.

6. The process according to claim 5, wherein the raw oil is a synthetic oil obtained by a Fischer-Tropsch synthesis reaction.

7. The hydrocracking catalyst according to claim 2, wherein the amorphous composite metal oxide is at least one selected from silica alumina, alumina boria, and silica zirconia.

8. The hydrocracking catalyst according to claim 2, wherein the active metal is platinum.

9. The hydrocracking catalyst according to claim 3, wherein the active metal is platinum.

10. The hydrocracking catalyst according to claim 7, wherein the active metal is platinum.

11. A process for producing a hydrocracking catalyst comprising a catalyst support comprising a zeolite and an amorphous composite metal oxide having solid acidity, and at least one active metal supported by the catalyst support and selected from noble metals of Group 8 and Group 10 in the periodic table, comprising:

calcining or heating the zeolite and the amorphous composite metal oxide having solid acidity that constitute the catalyst support or a precursor of a hydrocracking catalyst, each comprising an organic compound, by raising the temperature at a rate of 1 to 50° C./h to a predetermined temperature to produce a carbonaceous substance comprising a carbon atom in the hydrocracking catalyst in an amount of 0.05 to 1% by mass in terms of the carbon atom.

* * * * *